United States Patent [19]

Spreen

[11] Patent Number: 5,168,440
[45] Date of Patent: Dec. 1, 1992

[54] TRANSFORMER/RECTIFIER ASSEMBLY WITH A FIGURE EIGHT SECONDARY STRUCTURE

[75] Inventor: James H. Spreen, Stone Ridge, N.Y.

[73] Assignee: International Business Machines Corporation, Armonk, N.Y.

[21] Appl. No.: 771,073

[22] Filed: Oct. 2, 1991

[51] Int. Cl.⁵ ............................................. H02M 7/06
[52] U.S. Cl. .................... 363/126; 336/226; 363/144
[58] Field of Search ............... 363/126, 144; 336/226, 336/232, 223

[56] References Cited

U.S. PATENT DOCUMENTS 895,801   8/1908  Schubert .
4,965,712 10/1990 Duspiva et al. ..................... 363/126

FOREIGN PATENT DOCUMENTS 97732   8/1979  Japan ................................... 363/126
155427 12/1979 Japan ................................... 363/126

*Primary Examiner*—William H. Beha, Jr.
*Attorney, Agent, or Firm*—Michael J. Scheer

[57] ABSTRACT

A transformer with a secondary structure formed in a figure 8 pattern. The secondary structure defines two conducting paths which each incorporate a rectifier and each encircle part of the core only once. The conducting paths overlap and cross only in the window region of the core. The design of the secondary structure allows for the mechanical connections to the transformer to be physically separated on opposite ends of the transformer assembly. This structure allows for alleviation of the connector congestion and provides better cooling and also permits shorter connections to the rectifiers.

14 Claims, 5 Drawing Sheets

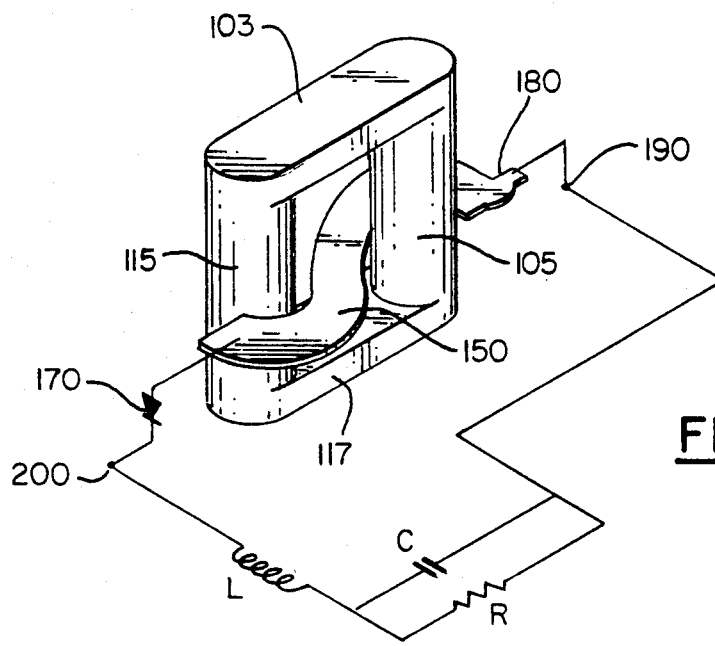
FIG. 2a
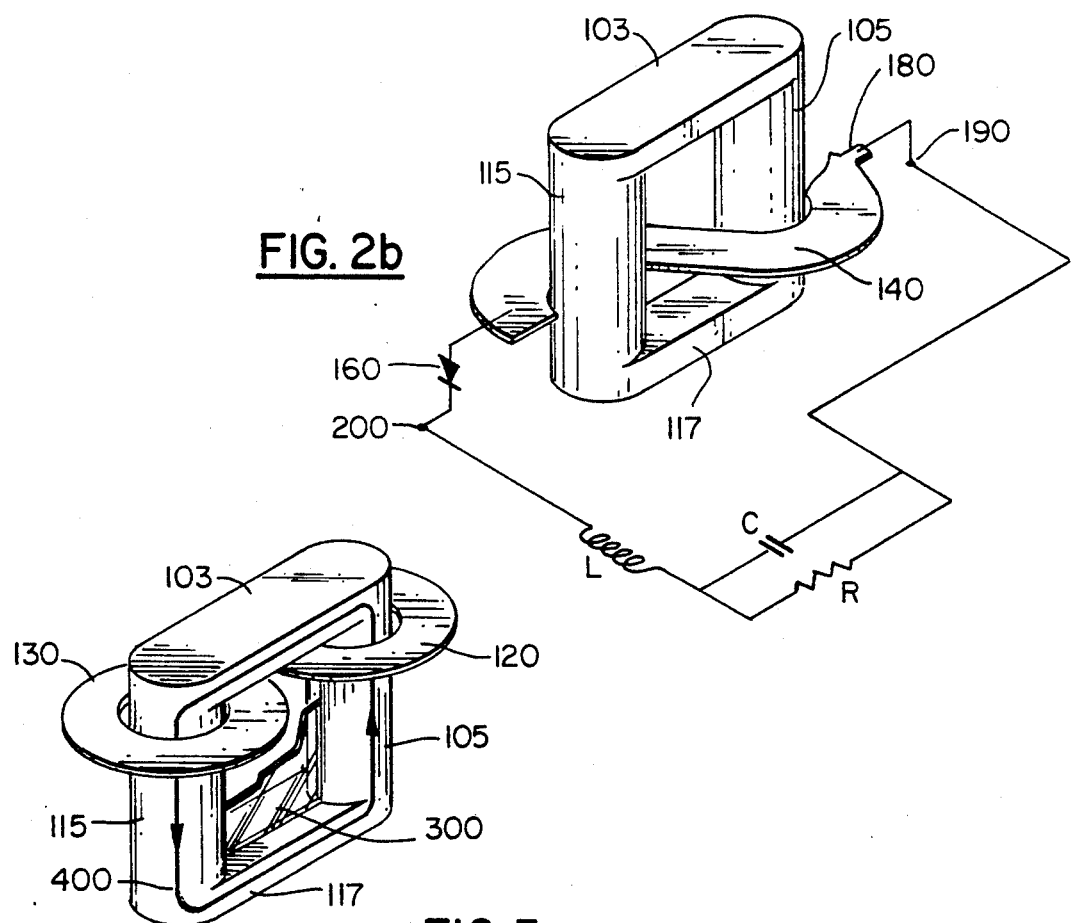
FIG. 2b
FIG. 3

TRANSFORMER/RECTIFIER ASSEMBLY WITH A FIGURE EIGHT SECONDARY STRUCTURE

FIELD OF THE INVENTION

This invention relates generally to electrical transformer structures and more particularly to a transformer with crossed secondary windings.

BACKGROUND OF THE INVENTION

Transformer-isolated power conversion circuits can be divided into two very general categories: single ended or asymmetrical converters, and symmetrical converters. In switch mode power converters, for example, well know asymmetrical converters include flyback converters, single switch forward converters, and asymmetric half bridge or dual switch converters. Symmetric converters include push-pull converters, half bridge with capacitors (or series push-pull) converters, and full bridge converters. Single ended converters generally have fewer components, are therefore more economical, and are favored over symmetric for low power applications. However, symmetrical converter circuits have a number of features which become particularly attractive at high power levels. These features include balanced use of the output rectifiers and reduced output filter requirements. Although the details of operation may differ for such varieties as square wave or resonant transition full bridge circuits, all well-known bridge or symmetrical drive circuits apply an alternating positive and negative voltage to the primary winding of the power transformer. In the transition period between the application of positive and negative voltage, there is an intervening zero voltage or freewheel time interval as may be required to accomplish regulation.

For high output voltage levels, such as might be used for motor drives or relays, the output from the secondary winding of the transformer is typically rectified using four rectifiers in a full bridge rectifier arrangement. However, for applications requiring low voltages and high currents, such as high performance logic circuits, the two rectifier forward voltage drops encountered in a full bridge rectifier will cause an unacceptable power loss. For these low voltage, high current applications, a center tapped secondary winding is typically used in conjunction with two rectifiers to obtain full wave rectification. This arrangement eliminates the unacceptable power loss due to the full bridge configuration since only one rectifier forward voltage drop is encountered.

In very high current applications, conventional wire cannot be employed as conductors in the secondary structure precisely because of the high current passing through the conductor. Typically, bus bars or copper plates or disks are used to accommodate the high current in these types of transformers. A significant difficulty in using either a bus bar or a copper plate or disk for the secondary structure is that it is mechanically awkward to make the three required connections (two rectifier and one center tap), which occur at one end of the transformer. FIG. 1 illustrates an exploded view of a conventional prior art bridge transformer and a typical manner of making the connections to the secondary structure. Elements 10 and 20 are the familiar C—C magnetic core halves, which when mated form a continuous magnetic flux path. Encircling post 25 of the core are the primary winding, 30 and 40, and the secondary winding, 50 and 60. As illustrated in FIG. 1, the secondary structure is constructed from three distinct elements, the two copper disks, 50 and 60, and the center tap piece 70. The center tap piece 70 in the secondary structure performs a traditional center tap function, but also serves as a level jump to connect the other two levels of the secondary structure, 50 and 60. The anode sides of the two rectifying diodes, 80 and 90, are shown connected to the secondary disks, 50 and 60, respectively, while the cathode sides of the rectifiers are shown commonly connected to the external circuit (shown as a filter-load comprising a LC filter and a load resistor R in FIG. 1). The other connection to the external circuit is shown from the center tap 70. As can be seen from FIG. 1, the prior art transformer structure requires that all three connections (secondary disk 50 to rectifier 80; secondary disk 60 to rectifier 90; and center tap 70 to the filter-load circuit) be made on the same side of the transformer, namely at or near core post 25. The mechanical difficulty of accomplishing these connections manifests itself most profoundly in the fabrication, assembly and mounting of the transformer.

Apart from the fabrication, assembly and mounting problems, the mechanical congestion of the connections can have a direct, degrading effect on electrical performance. The connection congestion interferes with the short, low inductance rectifier connections necessary for operation at high switching frequencies. Both the rectifier connections to the secondary and the rectifier connections to each other should be as short as possible to maintain low inductance. Having both rectifier connections and the center tap connection on the same physical side of the transformer increases the difficulty and therefore the length of these connections.

In high current transformer applications, the transformer will typically provide a large voltage step-down ratio and the different structural composition of the primary and secondary windings required to achieve this step-down will provide additional fabrication and assembly challenges. In such a transformer, the primary winding will contain many turns (typically on the order of 15 to 50) of relatively flexible conductor, such as wire, flat wire, or braid. In FIG. 1, the primary winding is shown as divided into two substantially symmetrical halves, 30 and 40, wired in a series aiding fashion. Each primary winding half is a planar, multi-turn coil of wire conductor. The primary will carry modest currents of 5 to 20 amps, peak alternating current (AC) with no direct current (DC) component. The primary winding must be insulated to withstand hundreds of volts to function, and perhaps thousands of volts to meet safety requirements. In comparison to the primary, the secondary structure contains relatively massive and inflexible parts, such as the copper disks 50 and 60 shown in FIG. 1. The secondary structure will carry hundreds of amps with both AC and DC components. Fifty volts functional insulation is adequate for the secondary.

The vastly different characters of the primary and secondary structures of such a transformer are likely to require different fabrication, assembly, and mounting techniques. Yet, in order to provide tight magnetic coupling between the primary and secondary structures, which is required by any high performance transformer, it is necessary that the two structures be in close physical proximity. To further improve the transformer coupling, the primary and secondary windings are often arranged in complex interleaved patterns or in a sandwich pattern, such as the one illustrated in FIG. 1. In that figure, the windings are all mounted on core post 25 with the secondary disks 50 and 60 being sandwiched between the primary coils 30 and 40.

While such arrangements improve the transformer performance, they introduce fabrication and assembly difficulties by requiring the intermingling of structures of vastly different character. Further, these sandwich or interleaved arrangements complicate thermal management in high power converters, since heat must flow across several interfaces between windings, in order to reach a cold plate or heat sink.

It is therefore one object of this invention to provide the electrical function of a conventional bridge transformer without the associated connection congestion normally associated with such a transformer.

It is also an object of this invention to provide tight magnetic coupling without the need for sandwiching or interleaving the windings of the transformer.

It is another object of this invention to facilitate fabrication assembly and mounting of a transformer structure.

It is an additional object of this invention to improve electrical circuit performance such as increased switching frequency.

SUMMARY OF THE INVENTION

In conventional full bridge transformers, the structural design and choice of materials for the primary and secondary windings lead to difficulties in magnetic coupling, connection congestion, output filtering, heat transfer, fabrication, assembly and mounting. The novel transformer of the present invention alleviates these problems by the use of a secondary structure which defines two conducting paths which encircle different parts of the core structure and cross in different directions in the window of the core in a FIG. 8 pattern. This pattern of the secondary structure allows the connections to the secondary to be positioned at opposite ends of the transformer thereby reducing mechanical congestion. In addition, this secondary structure allows greater flexibility in positioning the rectifiers themselves, accommodating spacing of the rectifiers to reduce thermal density, and thus permitting greater heat dissipation. This spacing of the rectifiers also allows for shorter and therefore lower inductance connections. By using appropriately constructed and connected windings on both core legs, magnetic coupling as tight as a sandwich structure is achieved, without physically interleaving or sandwiching the primary and secondary windings. This further leads to a reduced height of the transformer itself and also allows for greater heat transfer since there are fewer interfaces for heat to cross before reaching a heat sink. In the overlapping portion of the secondary conducting paths in the waist of the FIG. 8, an additional magnetic flux path can be incorporated into the core structure to provide inductive filtering. This permits, in the limit, elimination of the need for external inductive filtering.

BRIEF DESCRIPTION OF THE DRAWINGS

FIG. 2a illustrates one of the two secondary conducting paths in the structure of FIG. 2.

FIG. 2b illustrates the other secondary conducting path in the structure of FIG. 2.

FIG. 3 depicts the window region enclosed by the magnetic core of a transformer.

DETAILED DESCRIPTION

Figure 2:
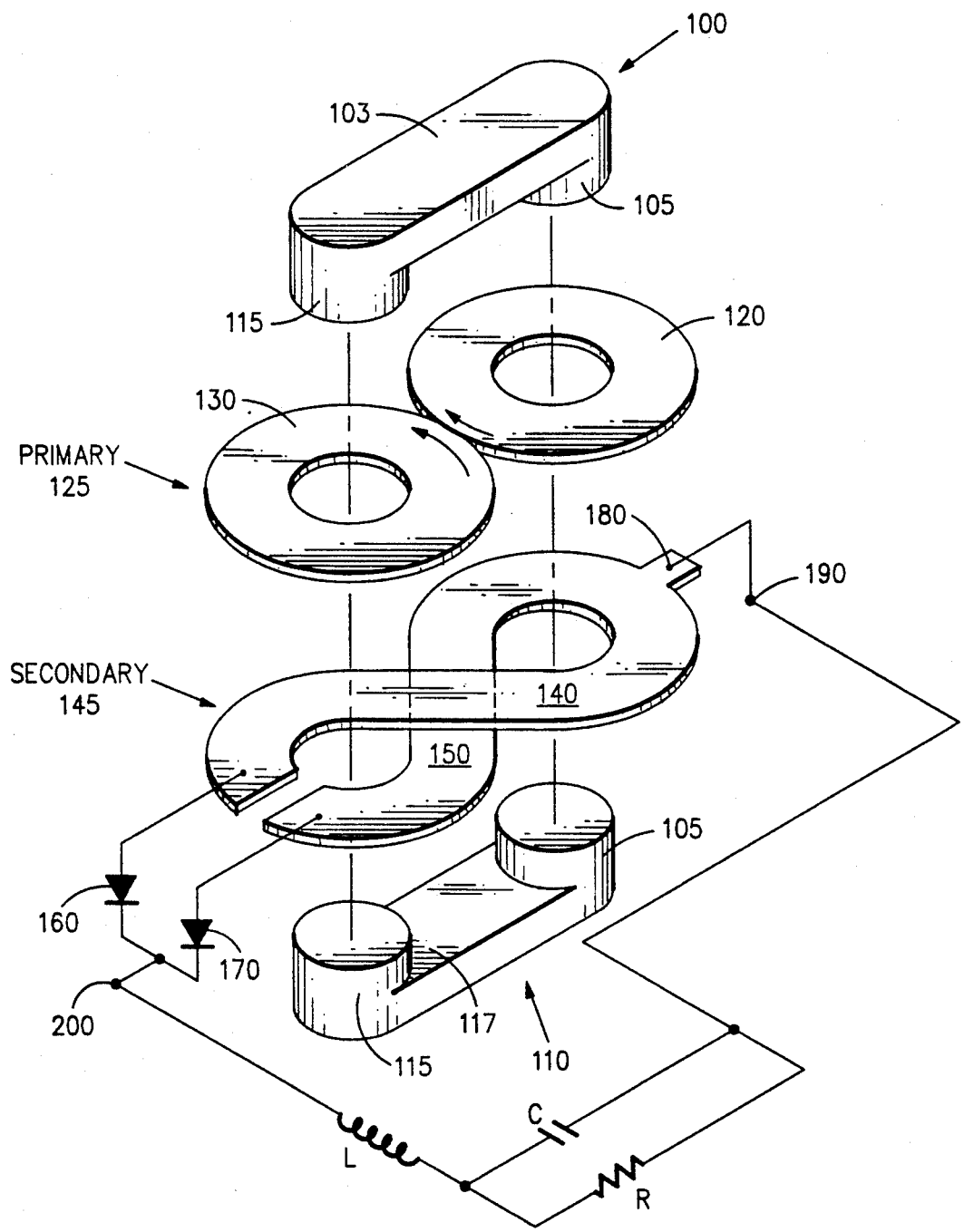
FIG. 2 shows an exploded view of a transformer embodying the present invention with crossed secondary windings.

FIG. 2 is an exploded view of a transformer embodying the present invention. When assembled, the C—C core halves 100 and 110 form one continuous flux path 400 through the core as can be seen in FIG. 3. In FIG. 3, the flux path 400 is shown traveling through the core material in the right core post 105, the upper core link 103, the left core post 115 and the lower core link 117. This flux path 400 encloses a window region 300 which resides in a plane. For purposes of illustration and description, the position of this plane is indicated by the broken transparent imaginary surface shown between the core legs in FIG. 3. The direction of the flux will depend on the direction of the current flowing in the primary windings at any given moment in time. The primary winding 125 is composed of two multi-turn planar coils 130 and 120. The coils 130 and 120 define a primary conducting path encircling core posts 115 and 105 respectively. The two coils 130 and 120 reside in a common plane which is shown in FIG. 3 to be orthogonal to the window region plane 300. The flux path 400 in the magnetic core passes through the primary coil plane twice, passing through a primary coil each time. The coils 130 and 120 may be wired in series or parallel, but must be phased so that the coil currents go through the core window 300 in the same direction, as indicated by the arrows on the coils in the FIG. 2. The direction of the current in the primary coils indicated in the figures is representative of the direction at one specific point in time. During another portion of the full wave cycle of operation, both the primary winding voltage and current will be reversed. The currents in the primary winding halves 130 and 120 will always travel in the same direction through the window region 300. The primary winding is connected with two leads (not shown in FIG. 2 for simplicity) to any of a variety of well-known symmetric drive primary circuits.

The output filter-load circuit is shown in the figures as a single stage LC filter and a load resistor R. The output circuit is connected between point 190, which in FIG. 2 is the same as the center tap 180, and point 200, which in FIG. 2 is the common cathodes of the rectifiers 160 and 170.

The secondary structure 145 is formed in a "FIG. 8" pattern around the two core posts 115 and 105. The "FIG. 8" is composed of two secondary segments, 140 and 150. These two secondary segments define two distinct secondary conducting paths. A first conducting path incorporating secondary segment 150 starts at the center tap 180, goes behind the right hand core post 105, through the core window in a back to front direction, in front of the left hand core post 115, to the connection to rectifier 170. When connected to the filter-load circuit, this conducting path essentially encircles right hand core post 105 once, as shown in FIG. 2a. This conducting path (containing secondary segment 150) does not encircle the left hand core post 115. The other conducting path, incorporating secondary segment 140, is shown more clearly in FIG. 2b. This path starts at the center tap 180, passes in front of the right hand core post 105, through the core window in a front to back direction, behind the left hand core post 115, to the connection to rectifier 160. Similar to the first conducting path, the path including secondary segment 140 encircles only one of the core posts, encircling it only one time. As shown in FIG. 2b, this path encircles only the left hand core post 115.

Figure 1:
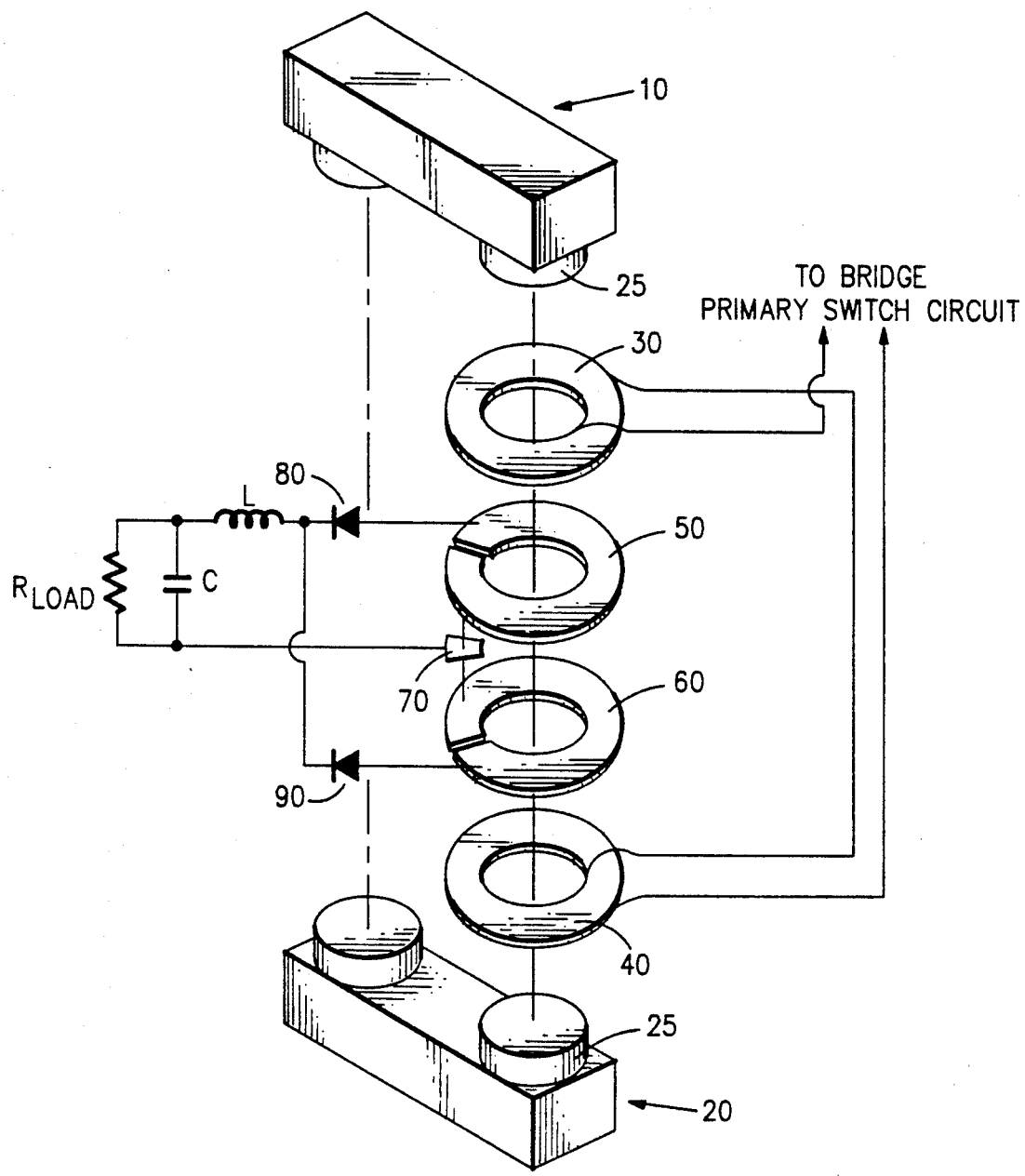
FIG. 1 depicts an exploded view of a typical prior art full bridge transformer.

As can be seen in FIG. 2, the two secondary segments are adjacent, and cross or overlap only in the window region 300 as they pass in different directions through the window. This crossing pattern of the secondary is very distinct from the conventional secondary pattern shown in FIG. 1. As is seen in FIG. 1, the two secondary disks 50 and 60 are adjacent and cross for essentially their entire length. In comparison, the two conducting paths of the present invention, as seen in FIG. 2, are adjacent and cross only in the window region of the transformer core. Furthermore, the two secondary halves shown in FIG. 1 are required to encircle the same core post while the secondary conducting paths of the present invention encircle entirely different posts of the core structure. Although not shown in FIG. 2 for simplicity, mechanical offsets and insulation for secondary segments 140 and 150 are required. The mechanical offsets will be needed for the two segments to clear each other in the overlap region, and the insulation is required to prevent the two conducting paths from electrically shorting to each other in the window region.

A transformer structure according to the present invention allows for reduced height as compared to the comparable conventional transformer as depicted in FIG. 1. The core window of the present transformer contains two thicknesses of secondary conductors (140 and 150), and only one thickness of primary winding (since primary coils 140 and 150 reside in a common plane in the window region 300). In a comparable conventional transformer, such as the one depicted in FIG. 1, the core window must contain two thicknesses of secondary conductors (50 and 60) plus two thicknesses of primary winding, (coils 30 and 40 are not co-planar). Along with allowing for a reduced height, the present structure facilitates heat transfer in that there are fewer interfaces and layers of material through which heat will have to pass to reach a heat sink. For example, let it be assumed that the heat sink is provided at the bottom of the transformer structure (further neglecting any electrical insulation). In the prior art transformer of FIG. 1, heat from the primary winding 30 will have to pass through secondary disk 50, secondary disk 60, primary coil 40 and the bottom core link 20 before reaching the heat sink. In comparison, in the present transformer depicted in FIG. 2, heat from either primary coil 120 or 130 will only have to pass through a single layer of secondary structure 145 and bottom core link 117 before reaching a heat sink. Because the present transformer has fewer interfaces and material, its structure greatly increases the capacity to dissipate heat.

As is seen by the externally connected circuits, i.e., a symmetric primary drive circuit, the rectifiers, and the filter-load, the electrical operation of the transformer structure disclosed here is equivalent to a conventional transformer with a center tapped secondary winding, with a sandwich winding arrangement for reduced leakage, such as that sketched in the prior art transformer depicted in FIG. 1. However, since the internal structure differs from conventional transformers, the internal current flow paths are described here for continuous conduction, square wave operation.

As mentioned earlier, during the on-time of the primary circuit, one of the polarities of voltage will cause the current in the primary winding 125 to flow in the direction of the arrows shown on the primary winding halves 130 and 120 in FIG. 2. With the primary current flowing in this direction (clockwise in primary half 120 and counterclockwise in primary half 130), a secondary current will be induced in a direction to oppose the primary current. As can be seen from the geometry of the FIG. 8 pattern in FIG. 2, the induced current in secondary segment 140 will attempt to travel from point 200 to point 190. Since rectifier 160 is reversed biased, though, no current at all will flow in the conducting path including secondary segment 140. The result of this is that all of the induced current in the secondary will flow through secondary segment 150. This current will flow in the conducting path shown in FIG. 2a, from the load, into the center tap 180, through the secondary segment 150 and rectifier 170, through the external inductor L and back to the load.

One of the basic equations governing the function of a transformer is shown in equation (1) and can be expressed as:

$$\frac{N_p}{N_s} = \frac{I_s}{I_p} \quad (1)$$

where
$N_p$ = the number of turns in the primary winding
$N_s$ = the number of turns in the secondary winding
$I_s$ = the current in the secondary winding
$I_p$ = the current in the primary winding
Equation (1) can be re-arranged to:

$$N_p I_p = N_s I_s \quad (2)$$

Since the number of effective turns of each secondary conducting path around the core in the present structure has been shown to be one ($N_s = 1$), equation (2) can be simplified as:

$$N_p I_p = I_s \quad (3)$$

Since the primary winding in the present structure has been divided in to two substantially equal coils, equation 3 can further be expressed as in equation (4):

$$\tfrac{1}{2}(N_p I_p) + \tfrac{1}{2}(N_p I_p) = I_s \quad (4)$$

The secondary current, $I_s$, is the total current traveling in the secondary structure and is therefore also the current traveling through the inductor L of the filter-load circuit. This current, $I_s$, will be termed the inductor current. As equation 4 shows, each primary coil carries amp-turns equal to $\tfrac{1}{2}$ the inductor current (neglecting magnetizing current). The total primary amp-turns going into the core window is then equal to the inductor current. As explained in the previous example, all of the inductor current in the secondary travels through secondary segment 150. The current is segment 150 travels through the core window in a direction opposite to that of the primary current. The result of the directions of the primary and secondary currents through the window is that the core encloses no net current.

During the on-time of the primary circuit with polarity reversed from that shown in FIG. 2, the secondary current similarly flows from the load, into the center tap 180, through secondary segment 140 and rectifier 160, out to L and back to the load. This secondary conducting path essentially encircles the left hand post 115 once as is shown in FIG. 2b. Since rectifier 170 in the other conducting path is reversed biased, no current will flow through secondary segment 150. Again, neglecting magnetizing current, the total primary amp-turns now coming out of the core window is equal to the inductor current (half in each coil), cancelling the effect of the inductor current in segment 140 going into the core window.

During any freewheel time when no current flows in the primary coils, there will be no induced current, both rectifiers 160 and 170 will be on, and the inductor current splits between the two secondary conducting paths (150 and 140). Neglecting magnetizing current, each path carries ½ the inductor current. Secondary segment 150 carries this current out of the window region 300, and segment 140 carries it into the window, so again, the core encloses no net current.

In contrast to the secondary turns in a conventional tightly coupled transformer, such as that shown in in the prior art transformer of FIG. 1, the secondary current paths in segments 150 and 140 in FIG. 2 do not match the geometry of the primary current paths during the on-times of the primary circuit. It might appear, then, that the transformer structure disclosed here has higher leakage inductance than a conventional structure. However, this is not true. The most significant undesired effect of leakage inductance occurs not during the on-times, but during the transition times. Therefore, it is critical to have low leakage inductance during the transition times. Transition times are the periods when the primary circuit is switching from an on-time state to a freewheel state, or freewheel to on-time. Only at these times is it necessary for the transformer primary winding to be able to readily induce the current into the secondary to accomplish the transition. A transformer will operate as a high-performance, low-leakage transformer if the geometry of the primary windings corresponds closely to the geometry of the path of the induced current needed to accomplish the changes in states.

In the transformer structure of the present invention, the geometry of the primary windings and the geometry of the path of the current which must be induced to accomplish state changes are closely matched. For example, consider the transition from an on-time (with rectifier 170 on) to a freewheel state. During the on-time, all of the inductor current will be traveling through secondary segment 150. During the freewheel time, the inductor current will be split evenly between secondary segments 140 and 150. Therefore, the current which must be induced into the secondary to accomplish this transition is a current of ½ the inductor current. This induced current will flow in the "figure 8" pattern, down through rectifier 160 (establishing the freewheel current in 160), up through rectifier 170, back through secondary segment 150, around through secondary segment 140 and back to rectifier 160. Of course, no current will actually flow in the reverse direction through rectifier 170, but the current induced during the transition time will oppose the current in segment 150, thereby reducing it to ½ the inductor current. This "figure 8" current is readily induced into the secondary by the current in the primary coils, each initially carrying amp-turns of ½ inductor current, decreasing to zero. Thus, the arrangement of the present transformer functions as a tightly coupled transformer, although neither half of the secondary winding individually matches the geometry of the primary winding, or even the geometry of the other secondary half.

It should be noted that as an alternative embodiment in order to further reduce leakage inductance, sandwich or interleaving techniques could also be used in the structure of the present invention. For example, primary coils 120 and 130 could each be further split into two coils, one positioned above and one below the secondary structure on each post. This sandwich design is most likely not needed in most applications incorporating the present invention since the figure 8 structure already has a reduced leakage inductance comparable to a conventional transformer with a sandwich structure. As a trade-off for reduced leakage inductance with a sandwich design, the increased heat dissipation of of the present invention will be lessened. For a specific application, the appropriate balance of reduced leakage inductance versus mechanical complexity and heat dissipation must be performed, based on engineering judgment.

Figure 4:
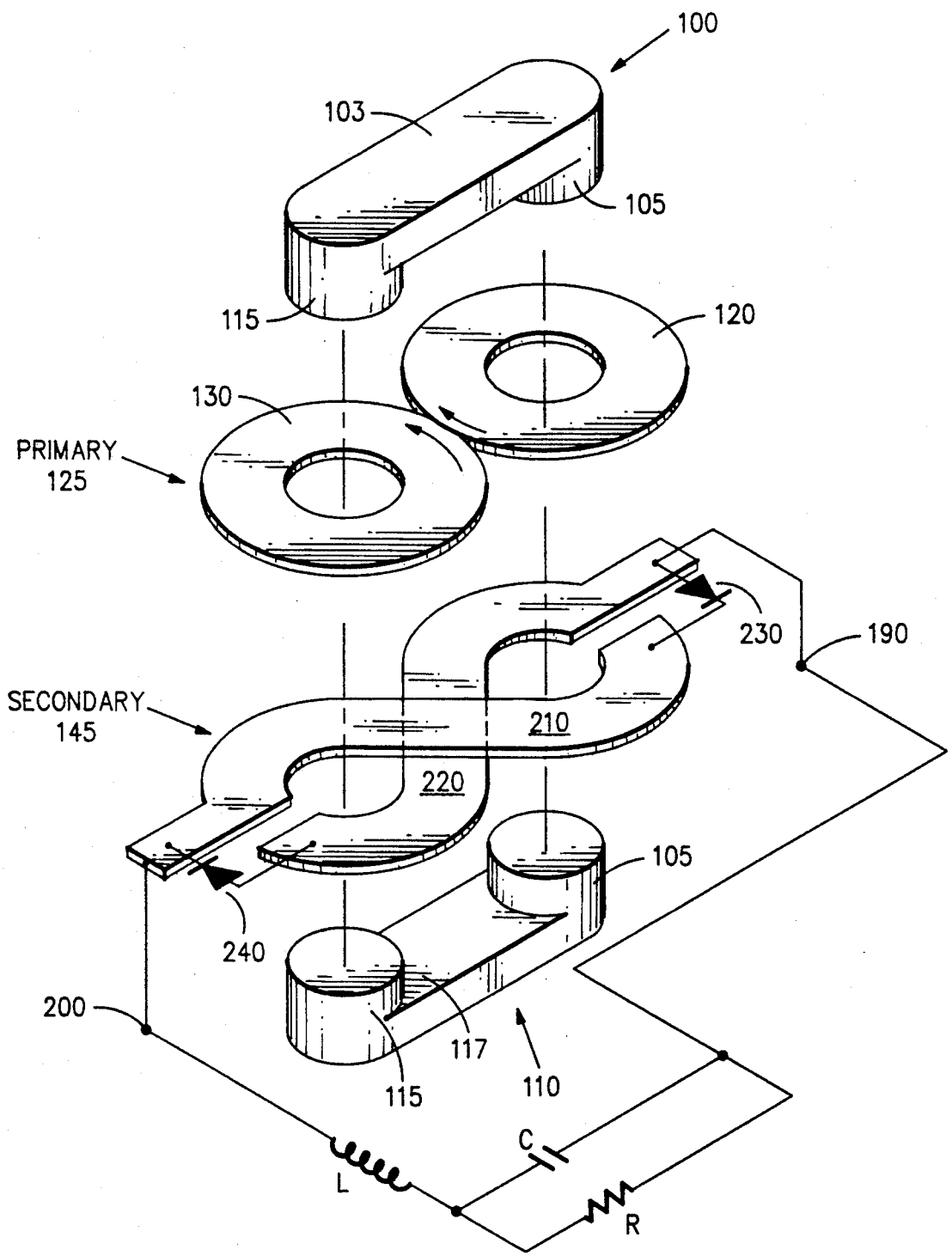
FIG. 4 illustrates an embodiment of the present invention with alternate rectifier positions.

An essential feature of the secondary structure 145 is that it provides two conduction paths from one common node on the right (the center tap 180 in FIG. 2) to a second common node on the left (the common cathode connection 200 in FIG. 2). Somewhere in each of these paths, there must be a rectifier. In FIG. 2, both rectifiers 160 and 170 are shown as being placed at the same end of the two paths. However, in principle, a rectifier can be positioned anywhere in the path. FIG. 4 illustrates an embodiment of the present invention where one rectifier 240 is positioned at the left end of secondary segment 220, and the other rectifier, 230, is at the right end of secondary segment 210. In this arrangement, the two rectifiers will be exiting from opposite ends of the transformer. This flexibility in rectifier position provides an opportunity to reduce the thermal density, by separating the rectifiers, or to enhance the mechanical design, for reduced parts or easier assembly. For example, the arrangement in FIG. 4 spreads the rectifier heating, which may allow for improved cooling over the arrangement in FIG. 2. In addition, the conductors providing the two conducting paths 220 and 210 in FIG. 4 may be formed from identically shaped pieces. Note that such rearrangements may make conventional descriptive terms meaningless. For example, in FIG. 4 there is no obvious center tap on the secondary winding.

Figure 5:
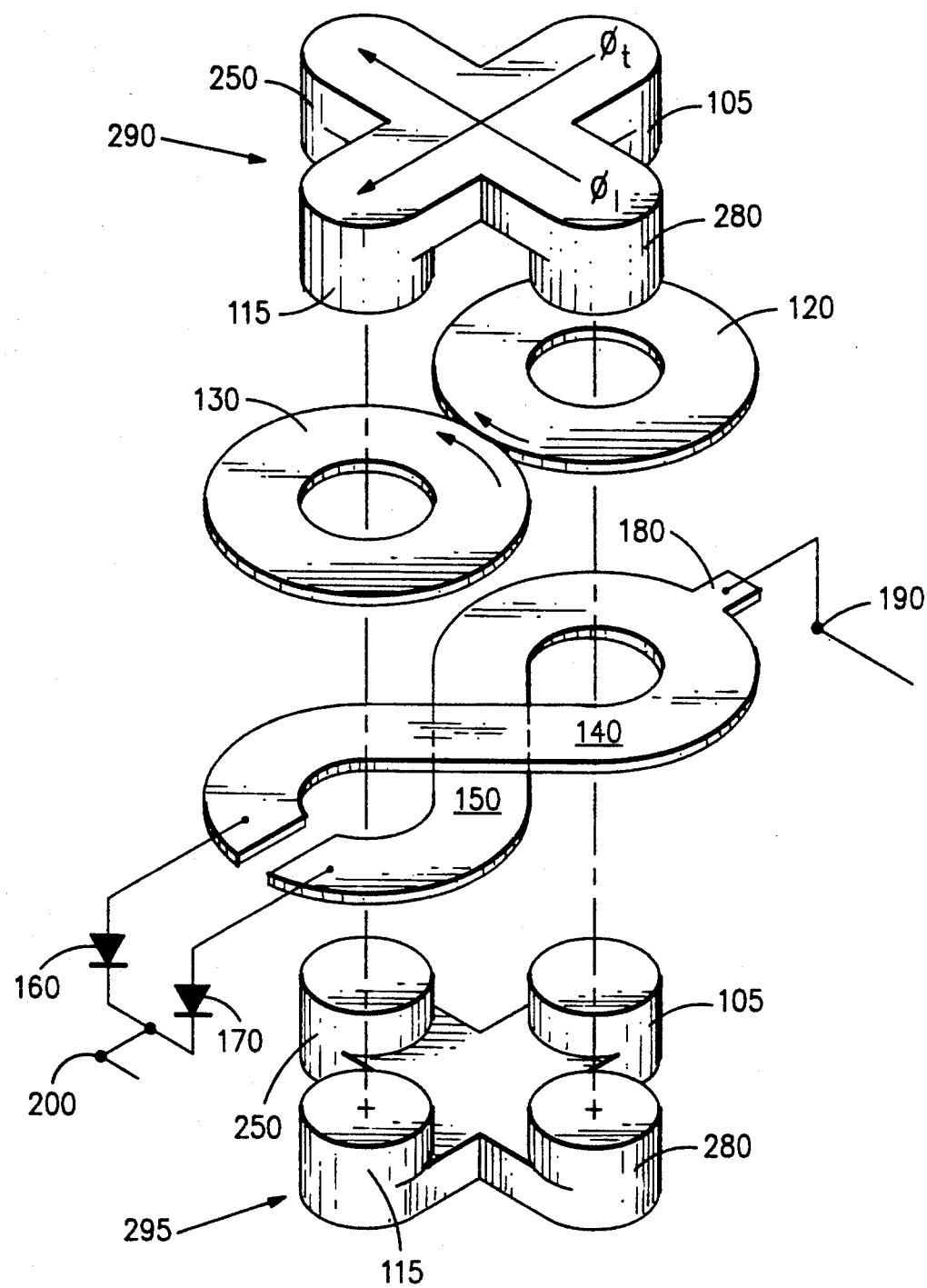
FIG. 5 is an exploded view of a transformer according to the present invention with the inclusion of an inductor path in the core of the transformer.

During operation of a transformer such as is described in FIG. 2, the current in the output filter inductor L will have to flow either exclusively in one of the secondary conducting paths 150 or 140 or else the current will be split between them. Given this arrangement, any magnetic core which encloses this total current by enclosing both paths 140 and 150 can provide additional filter inductance. This will allow the value and size of the inductor L to be reduced or, in the limit, eliminated. FIG. 5 illustrates how such an inductor flux path may be incorporated into the transformer core. Cores halves 290 and 295 in FIG. 5 are similar to the core haves 100 and 110 in FIG. 2, but have added crosspieces 280 and 250. These added crosspieces provide a flux path around the narrow waist of the "figure 8" secondary conductor geometry where the two conductor segments 140 and 150 cross in the window region 300. The path for flux $\phi_t$ is the path for the ac transformer flux just as in the conventional core shown in FIG. 2. This flux path does not need to have any deliberate gaps. The path for the flux $\phi_l$ is subjected to the dc flux, just as in an output inductor, and must therefore, be gapped to prevent saturation. The core portions which define the path for flux $\phi_l$ encloses a window which is orthogonal to the window region 300 (FIG. 3) enclosed by the path for flux $\phi_t$. Since the two flux paths $\phi_t$ and $\phi_l$ are orthogonal, the transformer portion and the inductor portion of the core can each be designed independent of the other, with the exception of the core region in which the two fluxes cross. In this region, the flux levels are governed according to equation 5:

$$\phi_m \geq \sqrt{(\phi^2_t + \phi^2_l)} \tag{5}$$

where $\phi_m$ is the maximum flux level capability of the core in that region, in order to avoid saturation.

The winding arrangement of the transformer structure disclosed in FIG. 5 therefore provides an opportunity to incorporate some output filter inductance into the transformer core. The external filter inductor, L, can then be reduced in size, or in the limit, eliminated. The trade-off for inductance added in the transformer core versus size of the conventional separate inductor must be based in each case on engineering judgment.

The mixed exploded views and circuit schematics shown in the figures do not define the precise physical location of the rectifiers with respect to the transformer windings. The rectifiers may be conventionally packaged rectifiers, mounted exterior to the transformer, with electrical connections to the transformer, as indicated in the figures. To eliminate any external connection inductance, the rectifiers may be incorporated into the secondary structure of the transformer itself, by using a rectifier similar to the one described in an article entitled "Low Inductance Chip Connector for Power Rectifiers" published in IBM Technical Disclosure Bulletin, Vol. 29 No. 3 Aug. 1968, pp 1071-1072. The flexibility of allowing for shortened leads or embedded rectifiers allow the use of increased switching frequency.

While particular embodiments of the present invention have been shown and described, it will be understood by those skilled in the art that modifications may be made to a particular embodiment without departing from the true spirit and scope of the present invention.

I claim:

1. A transformer rectifier assembly comprising:
   a core structure forming a continuous magnetic flux path enclosing a window region;
   a primary conducting path encircling two different parts of said core structure;
   a secondary structure encircling said two different parts of said core, said secondary structure having first and second conducting paths, each of said first and second conducting paths incorporating a rectifying means; and
   said first and second conducting paths being adjacent and crossing each other only in said window region, said first and second conducting paths conducting current in opposing directions through said window region.

2. A transformer-rectifier assembly as recited in claim 1 wherein:
   said secondary structure has a first terminal and a second terminal for electrically connecting said secondary structure to an external circuit.

3. A transformer-rectifier assembly as recited in claim 2 wherein:
   said rectifying means in both said first and second conducting paths are located between said window and said second terminal.

4. A transformer-rectifier assembly as recited in claim 2 wherein:
   said rectifying means in said first conducting path is located between said window and said second terminal; and
   said rectifying means in said second conducting path is located between said window and said first terminal.

5. A transformer-rectifier assembly comprising:
   a core structure having right and left posts, and upper and lower links, said core forming a continuous magnetic flux path enclosing a window region;
   a primary conducting path encircling said left post and said right post of said core;
   a secondary structure having first and second conducting paths and first and second terminals, each of said first and second conducting paths containing rectifying means;
   said first conducting path starting at said first terminal passing behind said right post, through said window, in front of said left post and terminating at said second terminal; and
   said second conducting path starting at said first terminal passing in front of said right post, through said window, behind said left post and terminating at said second terminal, whereby said first and second conducting paths are adjacent and cross only in said window region.

6. A transformer-rectifier assembly as recited in claim 5 wherein:
   said rectifying means in both said first and second conducting paths are located between said window region and said second terminal.

7. A transformer-rectifier assembly as recited in claim 5 wherein:
   said rectifying means in said first conducting path is located between said window region and said second terminal; and
   said rectifying means in said second conducting path is located between said window region and said first terminal.

8. A transformer-rectifier-inductor assembly comprising:
   a core structure having first and second continuous magnetic flux paths, said first and second flux paths respectively enclosing first and second window regions, said first and second flux paths being substantially orthogonal to each other;
   a primary conducting path encircling part of said first magnetic flux path;
   a secondary structure encircling part of said first magnetic flux path, said secondary structure having first and second conducting paths, each of said first and second conducting paths incorporating a rectifying means; and
   said first and second conducting paths being adjacent and crossing each other in both said first and second window regions, said first and second conducting paths conducting current in opposing directions through said first window region and conducting current in the same direction though said second window.

9. A transformer-rectifier-inductor assembly as recited in claim 8 wherein:

said secondary structure has a first terminal and a second terminal for electrically connecting said secondary structure to an external circuit.

10. A transformer-rectifier-inductor assembly as recited in claim 9 wherein:

said rectifying means in both said first and second conducting paths are located between said first window and said second terminal.

11. A transformer-rectifier-inductor assembly as recited in claim 9 wherein:

said rectifying means in said first conducting path is located between said first window and said second terminal; and said rectifying means in said second conducting path is located between said first window and said first terminal.

12. A transformer-rectifier-inductor assembly comprising:

a core of magnetic material having top and bottom structures;

first and third posts located between said top and bottom structures, said first and third posts and said top and bottom structures forming a first continuous magnetic path enclosing a first window region;

second and fourth posts located between said top and bottom structures, said second and fourth posts and said top and bottom structures forming a second continuous magnetic path enclosing a second window region;

said first and second window regions residing in substantially orthogonal planes;

a primary conducting path encircling part of said first magnetic flux path;

a secondary structure having first and second conducting paths and first and second terminals, each of said first and second conducting paths incorporating a rectifying means;

said first conducting path starting at said first terminal passing behind said first and second posts, through said first window, in front of said fourth and third posts and terminating at said second terminal; and said second conducting path starting at said first terminal passing in front of said first and second posts, through said first window, behind said fourth and third posts and terminating at said second terminal, whereby said first and second conducting paths cross in said first window.

13. A transformer-rectifier-inductor assembly as recited in claim 12 wherein:

said rectifying means in both said first and second conducting paths are located between said first window region and said second terminal.

14. A transformer-rectifier-inductor assembly as recited in claim 12 wherein:

said rectifying means in said first conducting path is located between said first window region and said second terminal; and said rectifying means in said second conducting path is located between said first window region and said first terminal.

* * * * *